W. F. NORRIS.
SPRING WHEEL.
APPLICATION FILED FEB. 14, 1921.
1,397,448.
Patented Nov. 15, 1921.
2 SHEETS—SHEET 2.
Fig. 3.
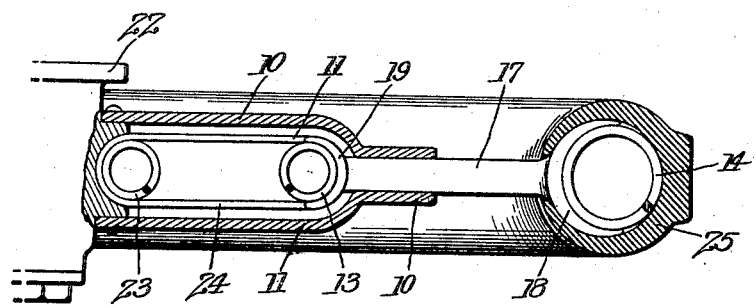
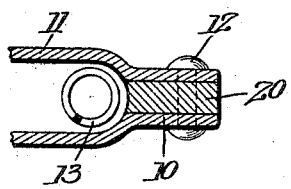
Fig. 4.
Wm. F. Norris,
INVENTOR

UNITED STATES PATENT OFFICE.

WILLIAM F. NORRIS, OF KANSAS CITY, MISSOURI.

SPRING-WHEEL.

1,397,448. Specification of Letters Patent. Patented Nov. 15, 1921.

Application filed February 14, 1921. Serial No. 444,785.

*To all whom it may concern:*

Be it known that I, WILLIAM F. NORRIS, a citizen of the United States, residing at Kansas City, in the county of Jackson and State of Missouri, have invented new and useful Improvements in Spring-Wheels, of which the following is a specification.

This invention relates to vehicle wheels and has for its object the provision of a spring wheel so constructed as to provide proper resilience without any necessity whatever for the employment of pneumatic tires, the device being designed to eliminate the annoyance incidental to the use of pneumatic tires on account of punctures, blow-outs, and the like.

An important object is the provision of a spring wheel of this character in which is provided spring means for cushioning the rebound and consequently having a shock absorbing effect which will materially lessen the danger of breakage in the wheel in case of undue strain and which will materially increase the easy riding qualities.

An additional object is the provision of a wheel of this character which is formed entirely of metal and which will consequently be extremely durable in addition to being very efficient in action and a general improvement in the art.

With the above and other objects and advantages in view, the invention consists in the details of construction to be hereinafter more fully described and claimed and illustrated in the accompanying drawings in which—

Fig. 3 is a cross sectional view on the line 3—3 of Fig. 1, and

Fig. 4 is a cross sectional view on the line 4—4 of Fig. 1.

Referring more particularly to the drawings, I have shown my wheel as comprising two disks 10 which have their central portions offset outwardly, as shown at 11, and which have their outer peripheries formed flat and bolted or otherwise secured together, as shown at 12. These disks are mating and the offset portions 11 define an annular channel within which is disposed a coil spring 13 formed into circular shape.

Figure 1:
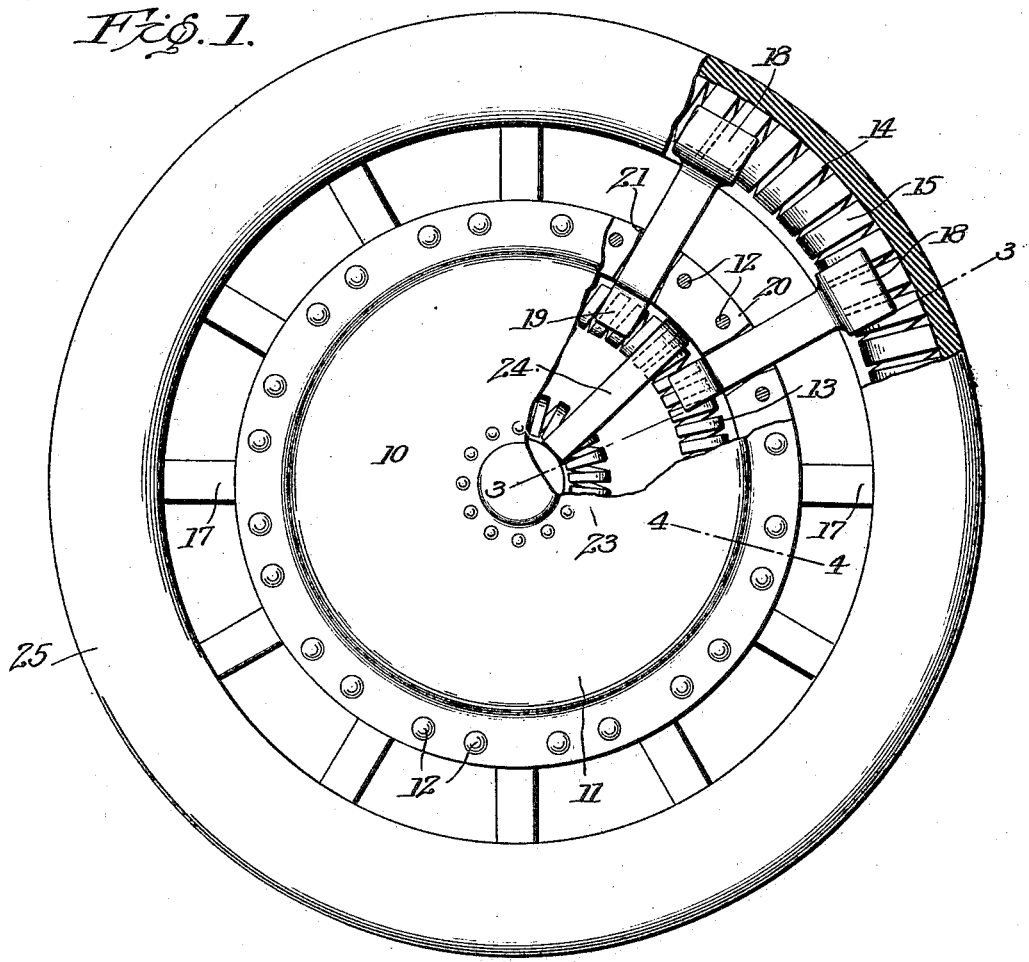
Figure 1 is a side elevation of my wheel with parts broken away and in section.
Figure 2:
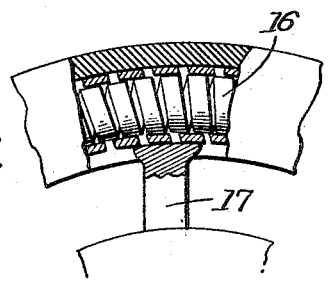
Fig. 2 is a fragmentary elevation of a modified form of outer rim or tire portion, parts being in section.

The numeral 14 designates the outer rim or tire portion which may be formed, as shown in Fig. 1, of a single spring wrapped to define a plurality of convolutions 15 or which may be formed as shown in Fig. 2, that is of two springs having their convolutions 16 oppositely arranged. This second mentioned form is of course stronger but involves slightly more expense in its manufacture. The numeral 17 designates the spokes which have their outer ends forked, as shown at 18, and engaging against the outer rim 14, which have their intermediate portions slidable radially of and movable circumferentially slightly, with respect to the disks 10, and which have their inner ends forked, as shown at 19, and engaging the spring 13. These forks are spaced from the adjacent portions of the disks as shown. The flat portions of the disks 10 are spaced apart by segmental shaped filler plates 20 arranged in spaced relation and defining slots 21 within which the spokes are disposed.

The numeral 22 designates the hub which is secured centrally of the disks 10 and surrounding this hub is a coil spring 23. Connecting the spring 23 with the spring 13 are radially disposed elongated loops 24.

In case the wheel strikes an unusual obstruction which would cause undue strain, the loops 24 coöperate with the springs 23 and 13 to exert a shock absorbing action.

In actual practice the outer rim or tire portion 14 carries a casing 25 of leather or rubberized fabric similar to well known tire construction.

In the use of the wheel it will be seen that as it travels along the ground the weight will be sustained by the spring 13, the spokes 17 moving radially inwardly in an obvious manner. It will be noted that owing to the provision of this particular spring mounting as well as the provision of the spring 23 and loops 24 connecting the latter with the spring 13, that an efficient shock absorbing means is provided which will greatly increase the easy riding qualities.

While I have shown and described the preferred embodiment of my invention, it is of course to be understood that I reserve the right to make such changes in the form, construction and arrangement of parts as will not depart from the spirit of the invention or the scope of the subjoined claims.

Having thus described my invention, I claim:

1. A spring wheel comprising a pair of disk members secured together and oppositely offset at their centers to define a channel, a central hub, a spring within said channel, a coil spring encircling the hub, an outer rim member, spokes connected with the rim and with said first named spring, and loops connecting said springs at spaced intervals.

2. A spring wheel comprising a pair of disks formed with mating pressed out portions coöperating to define a channel, spacing elements between the disks operating to define a series of radial openings leading into said channel, a coil spring located within said channel, a hub member at the centers of said disks, a coil spring located between the disks and surrounding said hub, a plurality of elongated loops engaging both of said springs, an outer rim member, and a plurality of spokes slidable through said radial openings and having forked ends engaging against said first named spring and said rim member.

In testimony whereof I affix my signature.

WILLIAM F. NORRIS.

Witnesses:
 JOHN E. WINFREY,
 E. SPEAKRMAN.